US011055970B1

(12) United States Patent
Curry et al.

(10) Patent No.: US 11,055,970 B1
(45) Date of Patent: Jul. 6, 2021

(54) INTERACTIVE ENCLOSURE WITH VIRTUAL REALITY

(71) Applicant: UIPCO, LLC, San Antonio, TX (US)

(72) Inventors: James Matthew Curry, San Antonio, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/568,315

(22) Filed: Sep. 12, 2019

Related U.S. Application Data

(60) Provisional application No. 62/757,302, filed on Nov. 8, 2018.

(51) Int. Cl.
*G06Q 40/00* (2012.01)
*G07F 19/00* (2006.01)

(52) U.S. Cl.
CPC .......... *G07F 19/205* (2013.01); *G07F 19/202* (2013.01); *G07F 19/203* (2013.01); *G07F 19/206* (2013.01); *G07F 19/209* (2013.01)

(58) Field of Classification Search
CPC . H04L 2209/38; H04L 9/3239; H04L 9/3271; G06Q 20/108; G06Q 40/02
USPC ......................................... 235/379, 380, 382
See application file for complete search history.

(56) References Cited

U.S. PATENT DOCUMENTS 6,443,359 B1 * 9/2002 Green ................ G06Q 20/1085 235/375
8,306,510 B2 * 11/2012 Garcia ................. G06Q 20/223 455/414.1
8,751,393 B1 * 6/2014 Murray .................. G06Q 40/02 705/42
9,838,424 B2 * 12/2017 Brady ................. H04L 63/1466
10,693,993 B2 * 6/2020 Anderson .............. G05B 19/02
2003/0098984 A1 * 5/2003 Botten ................. B41J 11/0095 358/1.4
2006/0060647 A1 * 3/2006 Vergara ................. G07F 19/205 235/379
2006/0289628 A1 * 12/2006 Gunst .................... G07D 11/14 235/379
2008/0091601 A1 * 4/2008 Green ................... G07F 19/205 705/43
2010/0131865 A1 * 5/2010 Ackley ................... G06F 3/016 715/757
2013/0118094 A1 * 5/2013 Laspia ................... G06Q 30/06 52/79.1
2014/0081858 A1 * 3/2014 Block ................... G07F 19/207 705/43
2014/0198330 A1 * 7/2014 Gajera ................. H04N 1/4446 358/1.13
2017/0337783 A1 * 11/2017 Konecny ............... G07F 19/202
2017/0344965 A1 * 11/2017 Watson ................... G07F 19/20

* cited by examiner

*Primary Examiner* — Daniel St Cyr
(74) *Attorney, Agent, or Firm* — Plumsea Law Group, LLC

(57) ABSTRACT

A system and method for providing virtual banking transactions are disclosed. The system comprises a kiosk with an enclosing structure where a user or member of a bank can go to conduct business including various banking transactions. Within the enclosing structure, an interactive system includes a display where a virtual associate can be shown. The interactive system includes slots that can be used to pass documents between the physical and virtual parts of the system.

17 Claims, 8 Drawing Sheets

INTERACTIVE ENCLOSURE WITH VIRTUAL REALITY

CROSS-REFERENCE TO RELATED APPLICATIONS

This application claims the benefit of the U.S. Provisional Patent Application Ser. No. 62/757,302, filed Nov. 8, 2018, for "Interactive Enclosure with Virtual Reality," the entirety of which is hereby incorporated by reference.

TECHNICAL FIELD

The present disclosure generally relates to static structures, and in particular, smaller static structures like an enclosure with enclosed virtual reality interactive systems.

BACKGROUND

In the field of banking and financial services, automated teller machines (ATMs) provide convenience and 24 hour access. Because of their small size, ATMs can be widely distributed in greater numbers than traditional bank branches. However, ATMs are limited in the number and kind of transactions that can be conducted. There is a need in the art for a new solution that addresses these shortcomings.

SUMMARY

In one aspect, an enclosure includes a perimeter and a wall structure corresponding to the perimeter. The wall structure supports a roof, and the roof disposed above the wall structure. The wall structure and the roof define an interior void of the enclosure. A portion of the wall structure includes a sound attenuating material. An interactive device may be disposed on an exterior surface of the wall structure. The wall structure includes a doorway with a door and a security system associated with the door, where the security system selectively locks and unlocks the door. The enclosure further includes an interactive system disposed within the interior void of the enclosure. The interactive system including a camera and a display as well as a slot disposed proximate the display. The slot is configured to selectively dispense a document when a command from a remote server is received.

In another aspect, an enclosure includes a perimeter and a wall structure corresponding to the perimeter. The wall structure supports a roof, where the roof is disposed above the wall structure. The wall structure and the roof define an interior void of the enclosure. A portion of the wall structure includes a sound attenuating material. The enclosure includes an interactive device disposed on an exterior surface of the wall structure. The wall structure includes a doorway with a door and a security system associated with the door, where the security system selectively locks and unlocks the door. The security system unlocks the door if security information received from a user matches retrieved security information retrieved by the enclosure.

In another aspect, a static structure comprising an enclosure includes a perimeter and a wall structure corresponding to the perimeter. The wall structure supports a roof and the roof disposed above the wall structure. The wall structure and the roof define an interior void of the enclosure. A portion of the wall structure includes a sound attenuating material. The enclosure includes an interactive device disposed on an exterior surface of the wall structure. The wall structure includes a doorway with a door and an interactive system disposed within the interior void of the enclosure. The interactive system includes a camera and a display. The interactive system also includes a slot disposed proximate the display. The slot is configured to selectively dispense a document when a command from a remote server is received.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments represent a system and method for providing remote locations for business services. The embodiments may provide a secure location for business transactions between one or more people. All parties in the transactions may save time and expense using secured embodiments in remote locations. The security of the enclosure may allow anyone using the embodiments to conduct business transactions, including banking services, with confidence. The system and method represented can improve business efficiency through orderly scheduling and virtual transactions. Orderly scheduling may allow for a steady flow of business needs without backup or over-scheduling and may save time and money for any parties involved. Virtual transactions allow for increased speed of data transfer, which also may contribute to time and money saved for any parties involved. In one embodiment a virtual transaction is represented by a client being able to sign, scan and send documents. A customer may also receive immediate feedback from a provider. With no restriction on what business transactions may be conducted in the embodiment, a client may no longer be required to travel to a location where a provider may be physically present. Both parties may save time and money through virtual transactions and multiple locations for embodiments may further simplify and lower cost for travel. The system and method of secure remote locations may allow for an increased party outreach. With more locations of service and wider accessibility, the system and method may provide an increased corresponding access for business services to any persons in need of conducting transactions.

Figure 1:
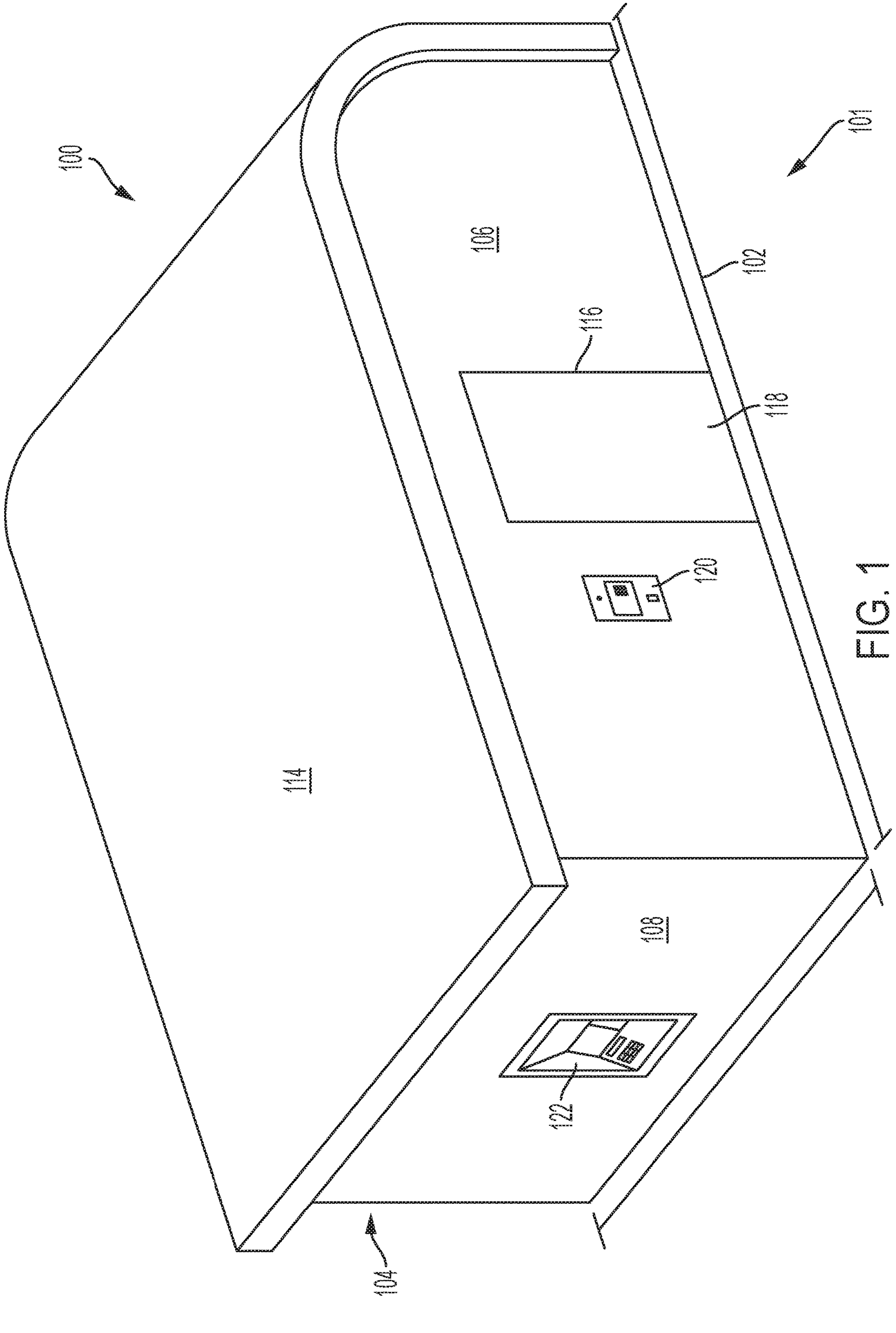
FIG. 1 is a schematic view of an embodiment of an enclosure.

FIG. 1 illustrates an embodiment of a banking kiosk 101. Kiosk 101 may comprise an enclosure 100 along with various components and resources that provide banking services for users. In some cases, kiosk 101 could be a stand-alone structure. In other cases, kiosk 101 could be part of a larger building or other structure.

Kiosk 101 may include an enclosure 100. The enclosure 100 may include a perimeter 102 which generally defines the footprint of the occupied area for the embodiment. Different embodiments may have different overall shapes and various footprints which may allow them to be accessed in many different types of locations. The embodiment shown in FIG. 1 may be generally rectangular. Other embodiments may employ different shapes or combination of shapes. Examples may include triangular, hexagonal or cylindrical embodiments. With various shapes and footprints the embodiments may be placed for maximum convenience and accessibility in various types of locations.

Enclosure 100 can include walls, a roof and/or floors. A wall structure 104 may correspond to the perimeter 102 of enclosure 100. The structure of the enclosure 100 may also include a roof. The wall structure 104 may support a roof 114, and the roof 114 may be disposed above the wall structure 104. In some locations, the enclosure 100 may be located outdoors and may be an independent structure. In other cases, the enclosure 100 may be located inside. If an embodiment is built inside of a large structure then enclosure 100 may share a roof with an existing structure. Some embodiments built indoors may include a roof 114 that may not be shared with an existing structure.

The structures of enclosure 100 may provide a comfortable sound attenuated environment within the enclosure 100. For reasons including security and peace of mind, the wall structure 104 and roof 114 may include one or more components that have sound attenuating or sound absorbing effects.

Figure 2:
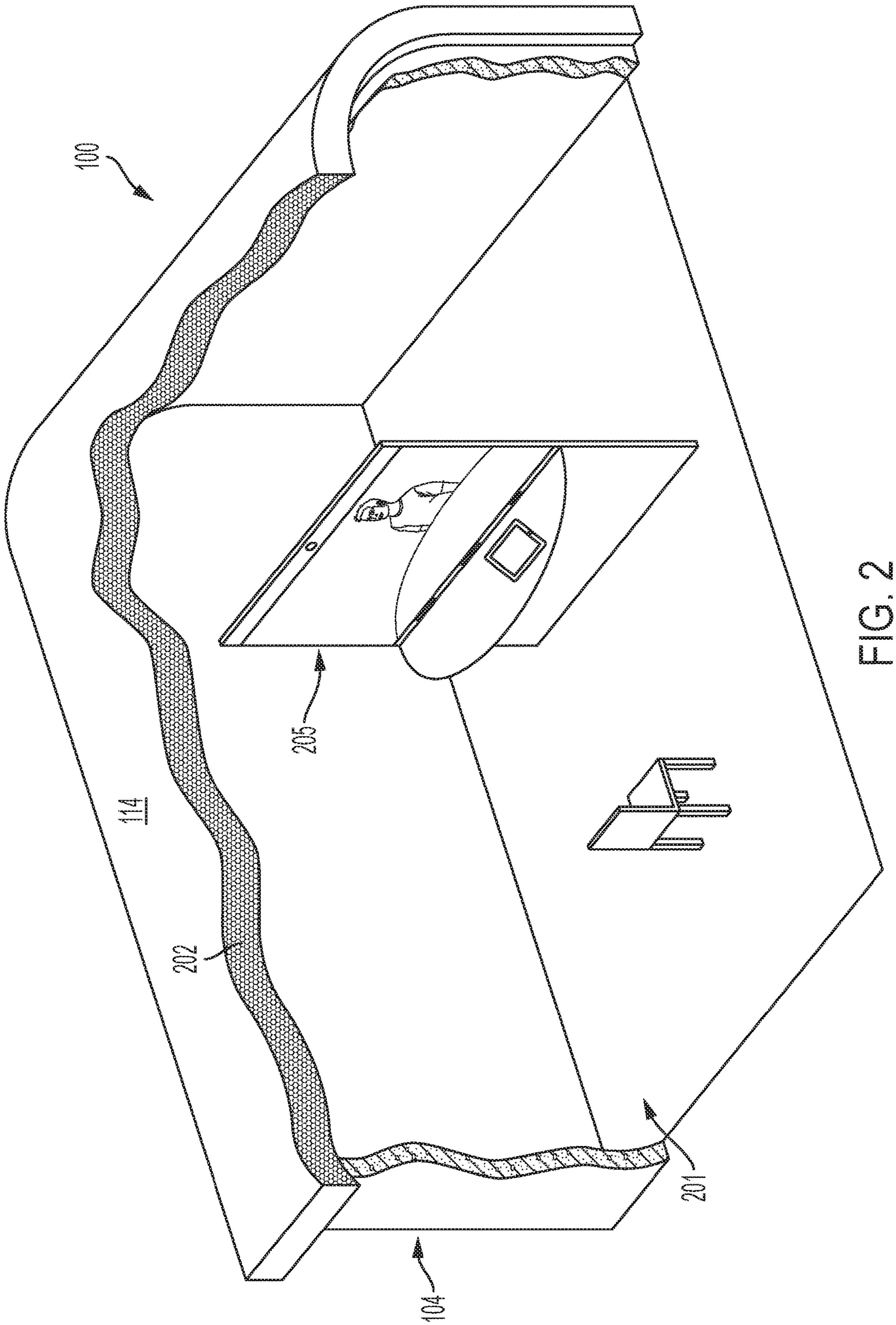
FIG. 2 is a schematic cutaway view of an embodiment of FIG. 1 with various interactive components.

FIG. 2 depicts a schematic view of enclosure 100 with some portions removed to reveal an interior 201 of the enclosure. Referring to FIGS. 1-2, in some embodiments, any present wall structure 104, roof structures 114 and floor structures 200, may include materials that may contribute to a sound attenuated environment within the enclosure 100. For example, the materials 202 comprising the roof, walls and/or floor of enclosure 100 could have sound absorbing properties. In some embodiments, the sound attenuating or sound absorbing material may be supplemental to other materials used in the wall structure 104. Examples of sounds attenuating or sound absorbing materials may be sound proofing foam or flexible fiberglass insulation batts.

Enclosure 100 may provide systems to facilitate banking transactions. As seen in FIG. 1, an exterior side 108 of enclosure 100 may include an automated teller machine 122, also referred to as an ATM 122. Some embodiments of the ATM 122 may include components to provide videotelephony. In other cases, the ATM 122 may be comprised of standard interactive features. In some embodiments, an ATM 122 may be accessed and used separately from transactions occurring in the interior 201 of enclosure 100.

In addition to the banking functionality provided by ATM 122, enclosure 100 may also include provisions to facilitate banking transactions within an interior of the enclosure. As described in further detail below, these provisions can include an interactive system 205.

Access to the interior of enclosure 100 may be provided through a doorway 116 with a door 118. The doorway 116 and door 118 may provide an entrance and an exit for the interior space 201 of the enclosure 100. The doorway 116 and door 118 may have an associated security system that may selectively lock and unlock the door 118. In some embodiments, components for locking and unlocking door 118 may be associated with an interactive device 120. In the embodiment of FIG. 1, doorway 116, door 118 and interactive device 120 are all associated with an exterior side 108 that is different from exterior side 108 where ATM 122 is disposed. In other embodiments, each of these components could be associated with the same exterior side of enclosure 100.

Figure 3:
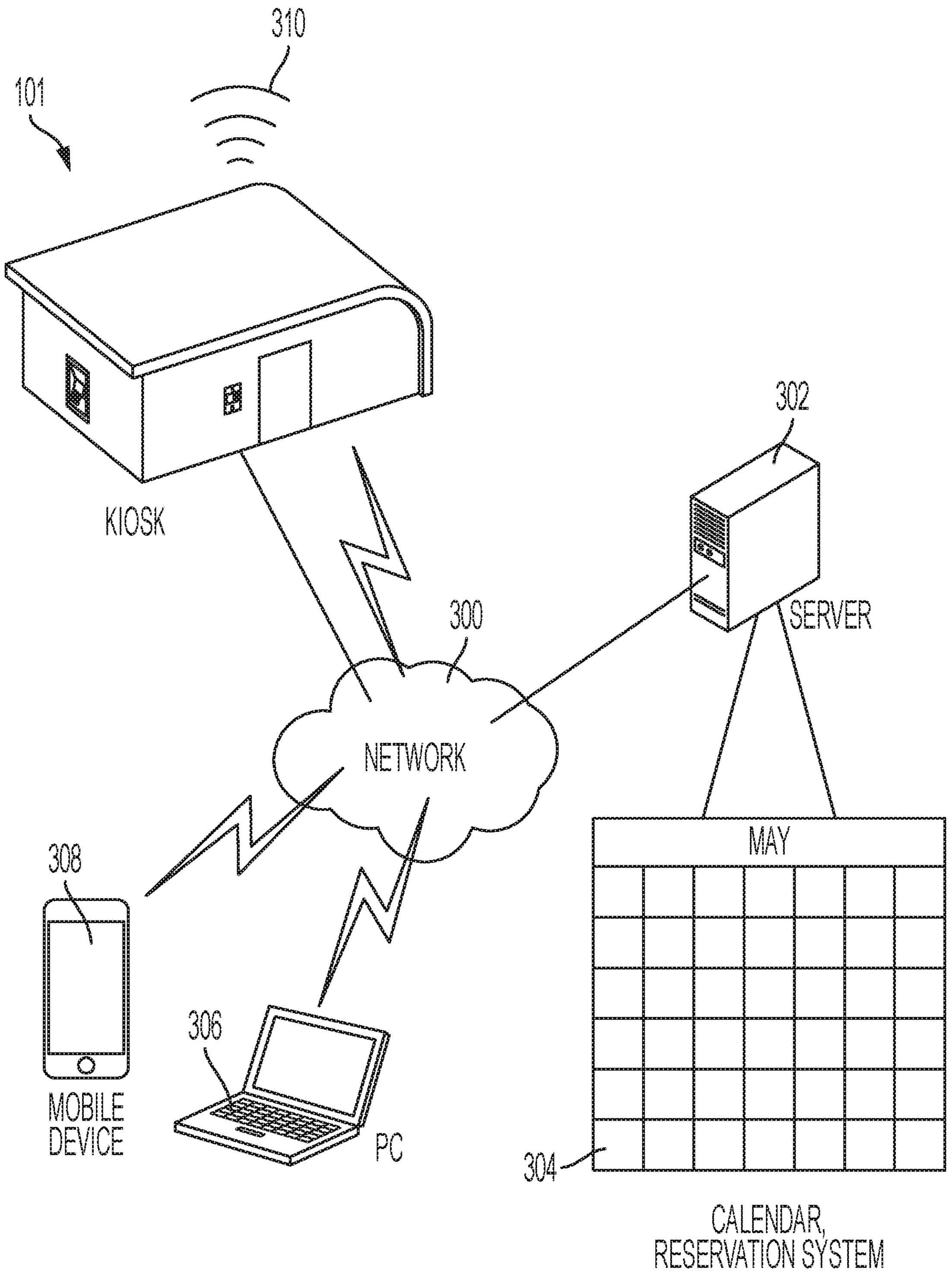
FIG. 3 is a schematic overview of various possible components that may interact with the embodiment of FIG. 1.

FIG. 3 is a schematic overview of various possible components that can interact with kiosk 101. Kiosk 101 may communicate with a server 302 via network 300. The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multi-protocol label switching (MPLS), User Datagram Protocol (UDP), hypertext transport protocol (HTTP) and file transfer protocol (FTP) as well as other protocols.

Kiosk 101 can be connected to network 300 through a hardwire connection or wirelessly. Similarly, server 302 can be connected to network 300 via a hardwire connection or wirelessly. Server 302 can be used to manage kiosk 101 and server 302 can send and receive information to and from kiosk 101.

Computing devices associated with a user can also be in communication with network 300. The embodiment shown in FIG. 3 shows examples of two devices, a mobile device 308 and a personal computer 306. Other computing devices, whether associated with the user or not may also be in communication with network 300. These computing devices associated with the user can be used to enhance the user's experience while interacting with kiosk 101.

Because kiosk 101 is designed to be unmanned and/or operated remotely, kiosk 101 is potentially operational at any time, and can host interactive sessions, 24 hours per day, 7 days a week. Because of the operational capability, some embodiments include provisions to schedule appointments in advance. Server 302 may include a reservation system, shown schematically as calendar 304, to manage appointments. Reservation system 304 can be made available to users. Using reservation system 304, users can view open time slots and reserve appointment times. Server 302 can record and retain the appointment times and the identity of the users who made them.

As noted earlier, FIG. 3 includes a schematic diagram of exemplary computing devices associated with a user. The personal computer 306 can be used to communicate directly with server 302 or personal computer 306 can communicate with server 302 through a website. In any case, the user can use personal computer 306 to interact with reservation system 304 to schedule an appointment. By using login credentials or other means, server 302 can determine the identity of the individuals associated with the various scheduled appointments.

Mobile device 308 could also be used to schedule an appointment. Like personal computer 306, mobile device 308 can be used to communicate directly with server 302 or mobile device 308 can communicate with server 302 through a website. Because mobile device 308 is portable, a user may bring mobile device 308 to kiosk 101. In such cases, mobile device 308 can also be used to interact with kiosk 101 security system, as discussed below.

Kiosk 101 can include one or more wireless network connections that may be accessible to users. In one embodiment, for example, a user's mobile device 308 could connect to a wireless network connection 310 associated with a computer or other networked device of kiosk 101. Authentication for enabling a wireless network connection 310 with kiosk 101 could be in the form of a password, or any other user identification information that could be stored on mobile device 308. In one embodiment, users logged into a banking application running on mobile device 308 could be automatically connected to kiosk 101 through wireless network connection 310 when they are in the vicinity of kiosk 101. Wireless network connection 310 may provide access to security features of kiosk 101, as well as access to reservation system 304, even when mobile device 308 is not online (that is, connected to the internet).

Figure 4:
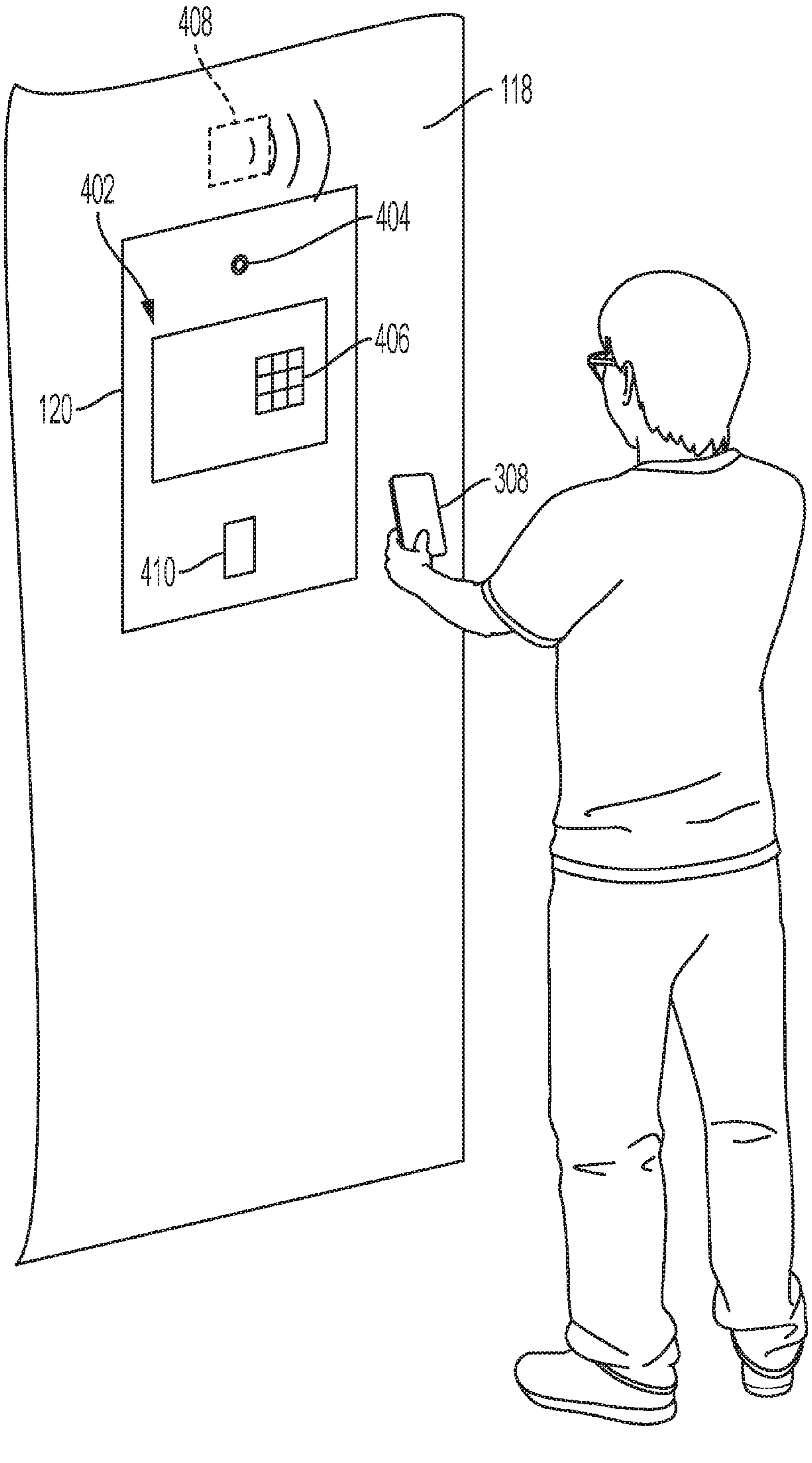
FIG. 4 is a schematic view of an embodiment that represents an interactive security system.

FIG. 4 illustrates an embodiment of interactive device 120. Embodiments of interactive device 120 can be associated with a security system. For example, elements of a security system 402 can selectively lock or unlock door 118 allowing access to interior 201.

Some embodiments of interactive device 120 can include provisions to facilitate secured access to kiosk 101. Referring to FIG. 4, the embodiment of interactive device 120 may assist with managing secured access to the interior of kiosk 101. Some embodiments of interactive device 120 may provide access to interior 201 by arrangements created in appointment scheduling system 304 (see FIG. 3).

Embodiments of security system 402 may operate in one or more ways. One embodiment of security system 402 may operate by using features of biometric technology. Security system 402 may use camera 404 to facilitate facial or retinal recognition of a user to unlock door 118. Some embodiments of security system 402 may include a biometric scanner. Biometric scanner 410 may scan user features, such as fingerprints, to unlock door 118. Other embodiments of security system 402 may operate in different ways utilizing biometric measurements.

Another embodiment of security system 402 may use geolocation and location proximity features to assist in identifying users arriving for appointments. Appointments may be previously made in appointment scheduling system 304 or made in real time as kiosk 101 may be available. Geolocation and location proximity system 408 may detect mobile device 308 within a specific proximity to door 118. Some embodiments of security system 402 may unlock door 118 if geolocation and proximity feature 408 detects mobile device 308. In other embodiments of security system 402, geolocation and proximity feature 408 may be associated with wireless network connection 310 so mobile device 308 may connect to wireless network connection 310. If a user connects mobile device 308 to wireless system 310, security system 402 may unlock door 118. In some cases, a mobile device 308 could provide authentication through near field communication with elements of interactive device 120 (such as geolocation and location proximity system 408).

Another embodiment of security system 402 may include a keypad 406 for entering alphanumeric passcodes. Some embodiments of security system 402 may allow access to interior 201 for a user if a manual passcode is entered directly into keypad 406. Some embodiments of security system 402 may include features for sending a manual passcode to mobile device 308. In some embodiments, a manual passcode may be sent within a designated time parameter prior to the scheduled appointment. In other embodiments, a manual passcode may be sent to mobile device 308 when connected to kiosk 101 through wireless network connection 310. Some embodiments may send a manual passcode to mobile device 308 if mobile device 308 is detected by geolocation and proximity feature 408.

Figure 5:
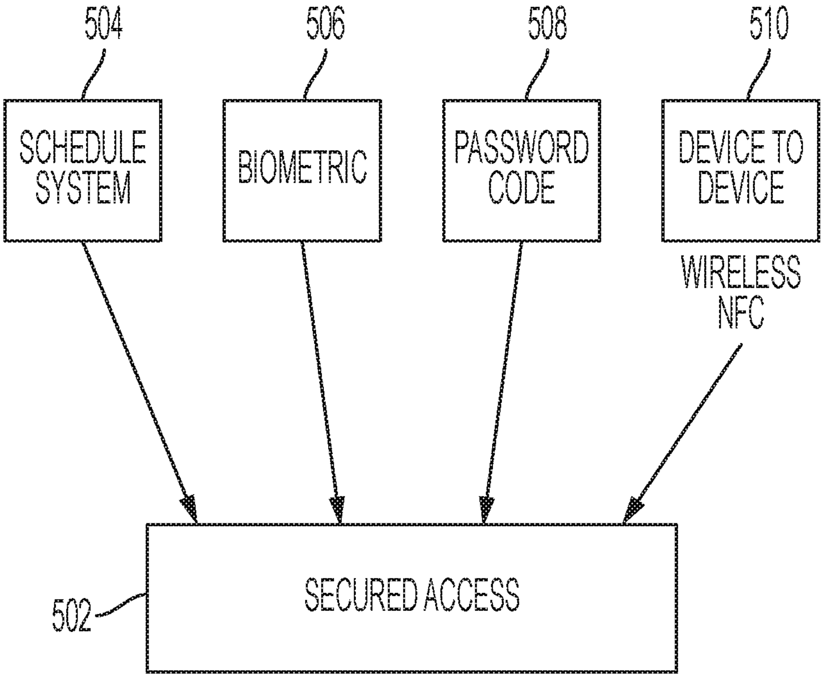
FIG. 5 is a schematic overview of various possible components that may interact with the embodiment of FIG. 4.

FIG. 5 is a schematic overview of various ways security system 402 may provide secured access 502 to kiosk 101. Referring to FIG. 5, embodiments of security system 402 may include one or more ways to provide secured access 502. Some embodiments of secured access 502 may include schedule system 504. Schedule system 504 represents the security elements associated with reservation system 304 (see FIG. 3).

Some embodiments of secured access 502 may include biometric identification system 506. Biometric identification system 506 represents the biometric security elements associated with interactive device 120; including camera 404 and biometric scanner 410 (see FIG. 4).

Some embodiments of secured access 502 may include password code 508. Password code 508 represents the security features of interactive device 120 associated with keypad 406 (see FIG. 4).

Some embodiments of secured access 502 may include device to device communication 510. Device to device communication 510 represents security elements of interactive device associated with wireless network connection 310, mobile device 308, and geolocation and proximity feature 408. In some cases, this device to device communication could include near field communication.

Figure 6:
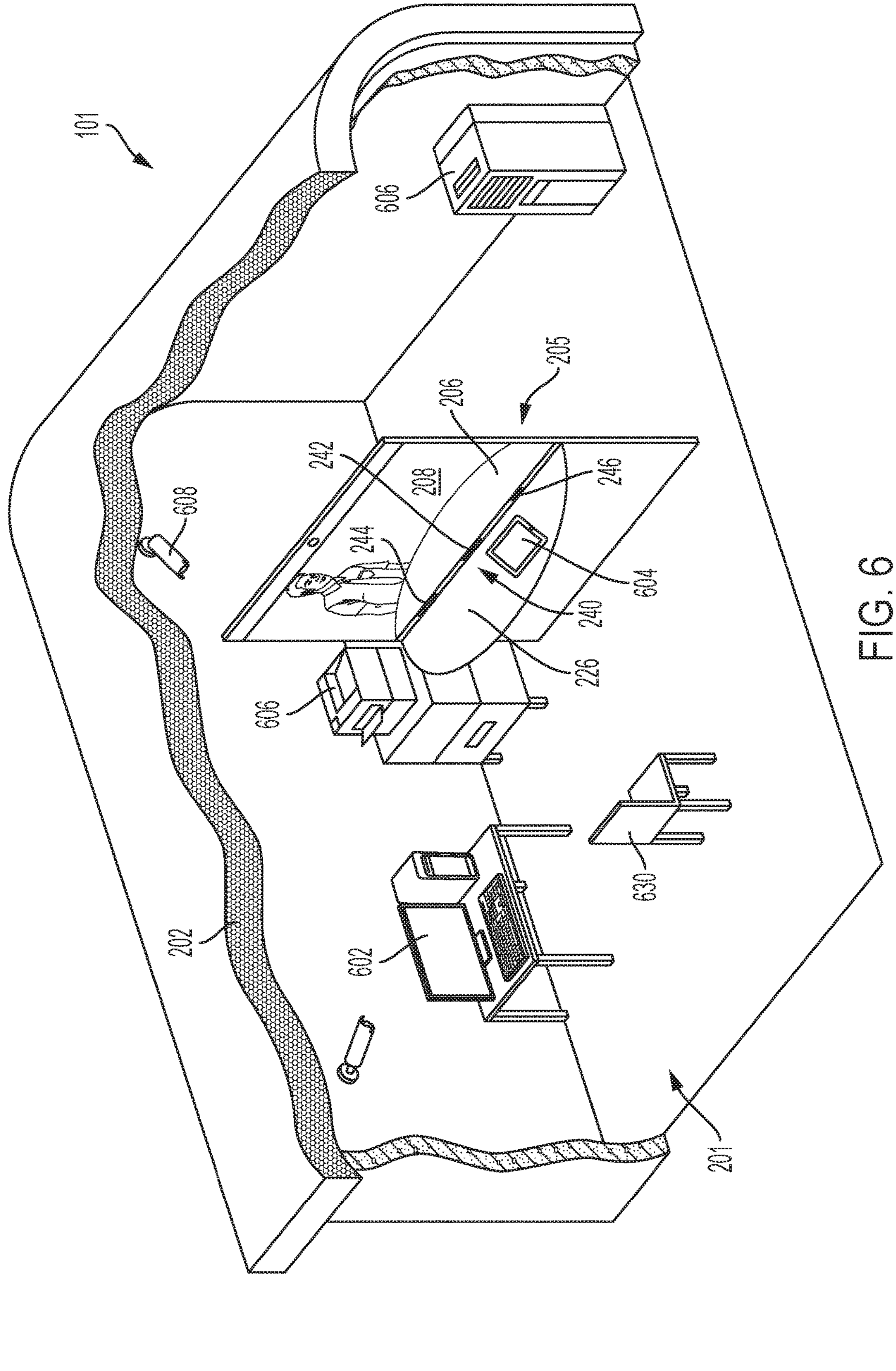
FIG. 6 is a schematic cutaway view of the embodiment of FIG. 1 containing various interactive components.

FIG. 6 illustrates a second cutaway view of kiosk 101 including additional components. Some embodiments of kiosk 101 may include components of an independent or supplemental heating, ventilation and air conditioning system 606, which may provide climate control of interior space 201. In some embodiments, the environment of interior space 201 may be controlled by a potential occupant. An example may include the occupant accessing control of the climate settings using mobile phone 308 (see FIG. 3). In other embodiments, the climate settings may be controlled from a remote location. Interior space 201 may include predetermined climate settings associated with a potential occupant's needs. In some cases, a potential occupant's climate preferences may be received through appointment scheduling system 304. If temperature preferences are known, for example, the temperature of interior space 201 may be adjusted prior to an appointment scheduled by a potential occupant. Other embodiments may allow a potential occupant to request any other controllable environmental settings prior to entrance of kiosk 101.

Kiosk 101 may include one or more electronic devices that may be accessible to a user. Electronic devices may include a computer 602, a tablet 604 or other suitable computing device. The computer or tablet may be associated with a printer 606. The computer or tablet may provide access to network 300 or wireless network connection 310 for an occupant (see FIG. 3). In some embodiments, the computer 602, tablet 604 and printer 606 may be associated with the interactive display system 205, also referred to simply as interactive system 205, of the interior space 201. Interior space 201 may also include a wireless network access point that may be accessed by an occupant.

Some embodiments of interior space 201 may include one or more video cameras 608 and microphones. In some cases, the video cameras 608 and microphones may have one or more functions regarding interior space 201. An example of a function may include, video and audio recording of interior space 201 used for security purposes. In some embodiments, the video and audio recordings may be used to validate business transactions that may have occurred in interior space 201 of kiosk 101.

In some embodiments, the occupant of interior space 201 may experience a simulation of a known or familiar environment. In some embodiments the environment may simulate the interior setting of a bank branch. In some cases, the environment can simulate the same interior design, décor, or "look and feel" of a branded bank branch. The embodiment may be sized to fit one or more persons inside of interior space 201. The environment of interior space 201 may include one or more components. One component may include one or more pieces of furniture 630. Examples of furniture 630 may include a chair, a coffee table or desk. Another component regarding the environment of interior space 201 may include elements that may affect interior lighting. The lighting of the environment may mimic lighting found in a physical bank branch. In some embodiments the lighting may be adjusted to the occupant's preference prior to the appointment. The preference and light settings for the environment may include brightness level and color choice. In some embodiments, the lighting of the environment may be controlled from a remote location outside of enclosure 100. In other embodiments, the occupant may access control of the light settings through the use of an application on mobile device 308.

Embodiments of interior 201 may include interactive system 205. Interactive system 205 may include components that help provide virtual banking experiences. These virtual banking experiences may include virtual interactions with tellers, loan managers, associates, or other employees or representatives of a bank or other business.

Interactive system 205 may include a large screen 208, or a projected image created by an image projecting device. Interactive system 205 may include a desk or table 226. In some embodiments, the desk or table 226 associated with interactive system 205 may have one or more slots 240 disposed of them. The slots disposed in interactive system 205 may have one or more functions. Examples of functions of the slots may include, but are not limited to: scanning, printing or providing storage for documents. Some embodiments of interactive system 205 may include a slot that may provide provisions for the occupant to deposit or withdraw funds in the form of paper money (and/or checks for deposits). In one embodiments, interactive system 205 includes first slot 242, second slot 244 and third slot 246.

Other components of interactive system 205 may include biometric technology. In some embodiments, interactive system 205 may use components of biometric technology to assist with conducting business. Examples of functions of biometric technology that may assist with business transactions may include the use of facial scanning to provide a virtual signature on appropriate documents.

Further components of interactive display 205 may include a sensor assembly 220. Sensor assembly 220 could include a camera and a microphone, for example. A camera may capture still or video images of a user that can be transmitted to a party outside of kiosk 101. Likewise, microphones can capture audio that can be transmitted to a party, such as an employee of a bank, outside of kiosk 101.

This exemplary configuration may allow an occupant to conduct business from within enclosure 100. Images and sounds captured by sensory assembly 220 can be transmitted to a remote teller, manager or other bank employee, who can virtually interact with the occupant through screen 208 as well as speakers (not shown). In some cases, speakers could be integrated with screen 208 or adjacent sensor assembly 220.

Referring to the configuration depicted in FIG. 6, one exemplary use of kiosk 101 by an occupant (also referred to as a "user" or "member") may proceed as follows. First, the member may meet the necessary criteria required by security system 402 to unlock door 118 during the designated appointment time. The member may enter interior space 201, beginning the simulated experience of conducting business at a bank branch. In some embodiments, interactive system 205 includes half of a real table 226, while screen 208 shows the other half as a virtual table 206.

In some embodiments, interactive system 205 may display a virtual a bank teller or associate 210 behind the virtual desk. Virtual associate 210 may be represented by an avatar or a digital character. In other embodiments, screen 208 may display video imaging, with audio, of a real bank teller or associate from a remote location. In either the real or virtual embodiment, the member may be provided with business services that may be conducted within a bank branch. Examples of business services may include applying for a loan, opening a line of credit, or depositing paper money.

In some embodiments, business that may be conducted within interior space 201 may require that the identify of the member be confirmed. Interactive system 205 may allow the member to provide the necessary identification information needed for any business to be conducted. Examples of methods that may be used for identification confirmation may include biometric measuring, such as facial or retinal scanning, or fingerprinting.

As already mentioned, interactive system 205 can include one or more slots 240. In some cases, a first slot 242 and second slot 244 may act as a document gateway between real and virtual worlds. In some cases, first slot 242 may function to print documents for a member, while second slot 244 may function to scan documents received from a member. Additionally, third slot 247 could function to dispense cash.

Figure 7:
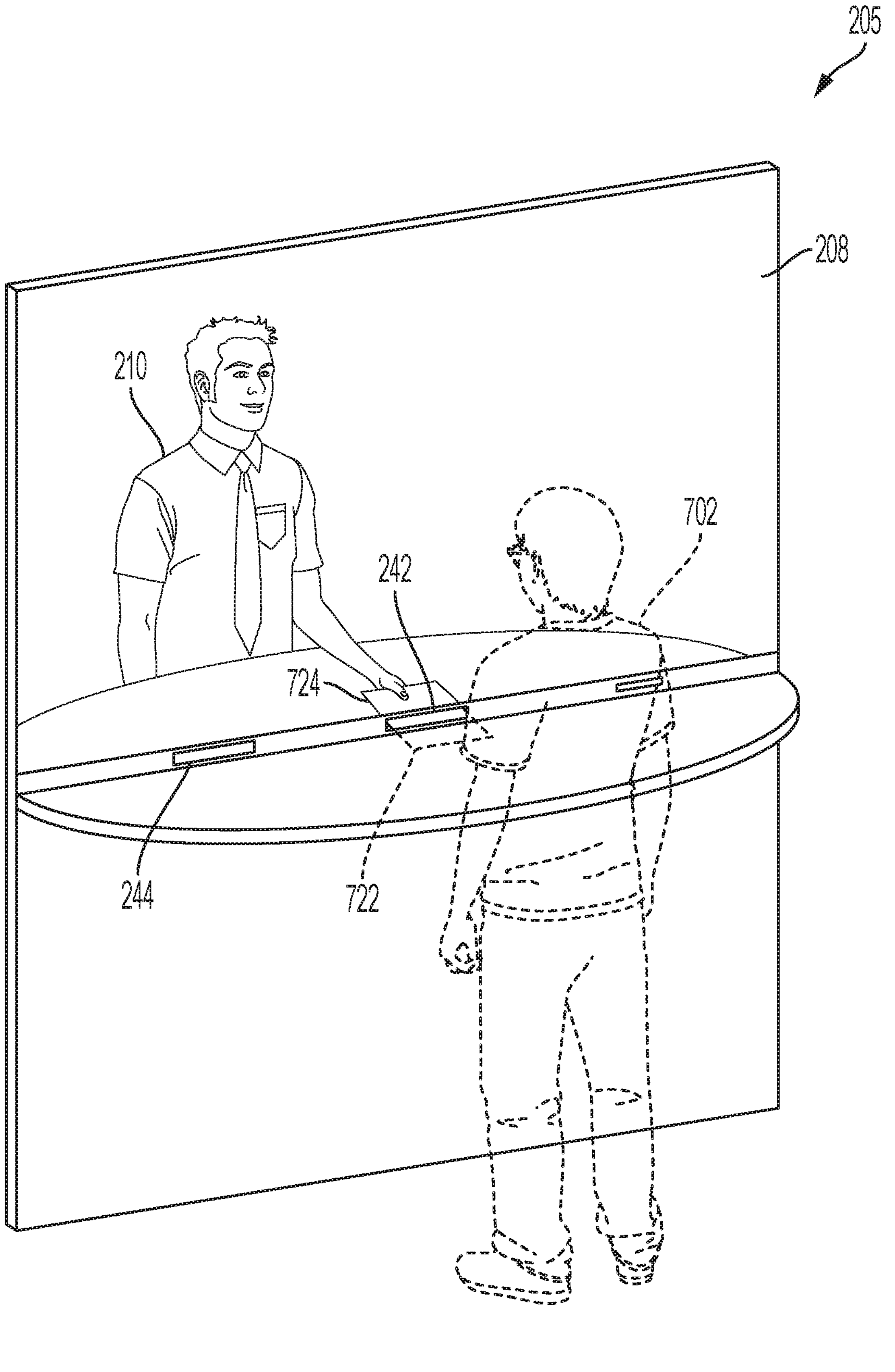
FIG. 7 is a schematic view of an embodiment representing a transaction.
Figure 8:
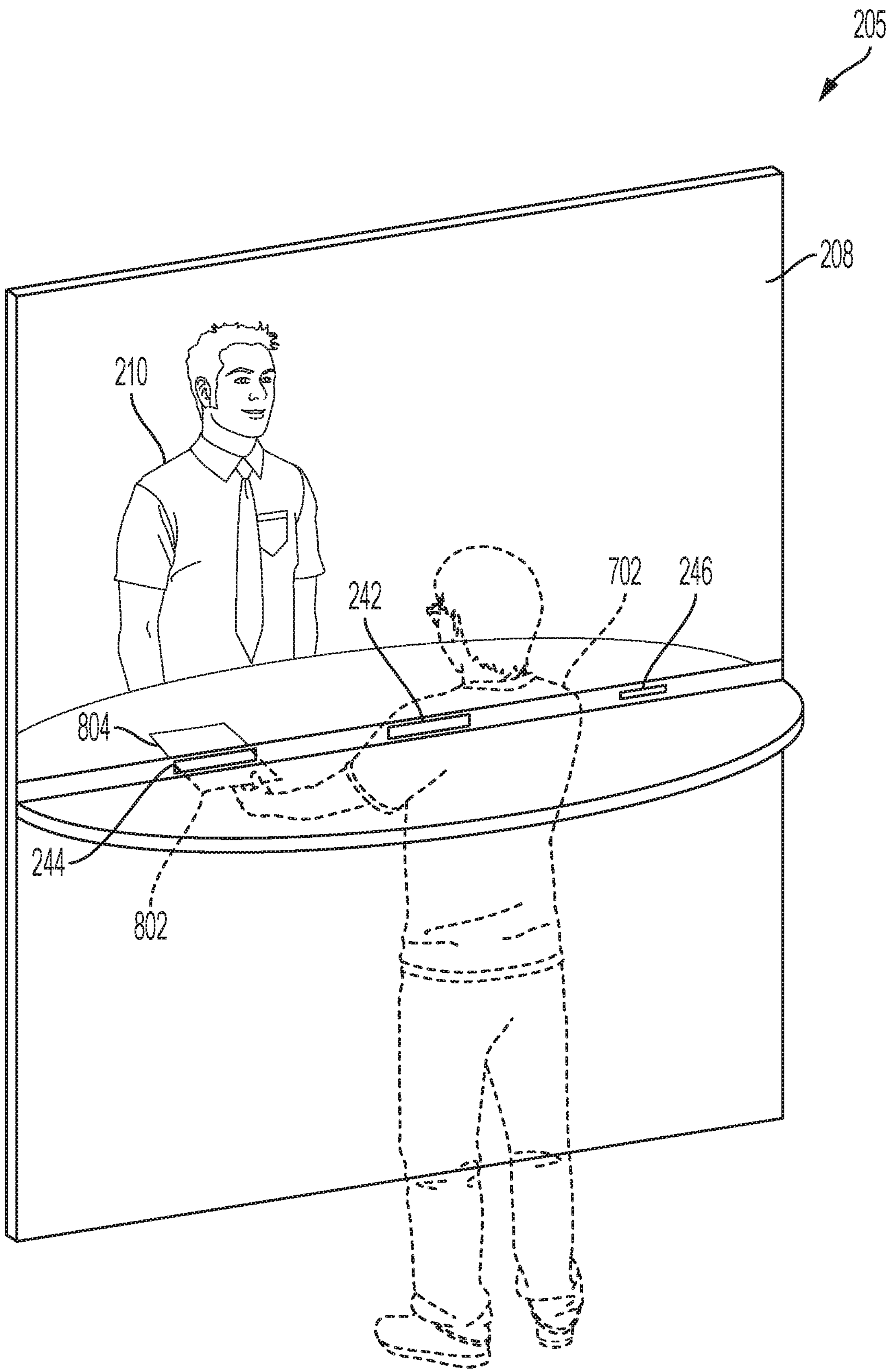
FIG. 8 is a schematic view of an embodiment representing a transaction that differs from FIG. 7.

FIGS. 7 and 8 depict schematic views of how first slot 242 and second slot 242 may be used to facilitate a virtual transaction. For example, in the configuration shown in FIG. 7, an associate 210 is shown on screen 208 passing a virtual document 724 in the direction of a member 702. Just as the virtual document 724 reaches the area on screen 208 associated with first slot 242, a physical document 722 is printed and pushed out of first slot 242. This may give the appearance of the associate 210 passing the document directly to member 702. To facilitate this effect, interactive system 205 can include software and hardware provisions that display virtual document 724 on screen 208 so that virtual document 724 and physical document 722 are aligned and appear as a single document being fed through first slot 242.

In another configuration, shown in FIG. 8, member 702 is shown passing a physical document 802 to associate 210. Specifically, member 702 inserts physical document 802 into second slot 244. Physical document 802 may be scanned and the scanned information can be used to generate a virtual document 804 that can be seen sliding towards associate 210 on screen 208. Additionally, the scanned information can be sent to any servers of the bank (such as server 302 of FIG. 3), so that the information on physical document 802 can be analyzed, stored, and/or used to facilitate the present banking transaction. In some cases, associate 210 can be shown reviewing virtual document 804.

It may be appreciated that in embodiments where a live feed of an associate is shown, the associate may also have access to corresponding slots where documents can be scanned and printed. Thus, when member 702 slides a document through second slot 244, that document can be scanned, transmitted to a computing system where the associate is located, and printed out for the associate as a physical document. Alternatively, if instead an avatar is shown, the scanned information may not be printed as a physical document for the associate, but simply shown on a display for the associate to read, while the avatar is depicted as reading a virtual document.

Other embodiments of interactive system 205 may include an additional slot 246 for transferring real paper money. A member may have the option to deposit or withdraw real paper money by receiving the money from the slot 246 or depositing money (or checks) into the slot. To facilitate the effect of virtually dispensing money, interactive system 205 may project an image of a virtual associate passing virtual money to a member through third slot 246. In such a case, the virtual image of the cash can be aligned with the physical money disposed from slot 246. Other embodiments of interactive system 205 may include components with other additional slots that provide additional functionality.

The exemplary embodiments described above can be used to facilitate a variety of different kinds of banking transactions. For example, the exemplary system could be configured to simulate a virtual bank teller window where members can deposit checks, cash checks, deposit cash, withdrawal cash, review their account balances or conduct other business related to their banking or checking accounts. In such embodiments, the member could insert checks or cash into one or more slots. The checks could be scanned for processing and for simulating the virtual interaction on screen 208. Deposit and withdrawal documents could also be passed to a member through a slot (that is, passed virtually and then printed or otherwise pushed through one of the slots). Deposit and withdrawal documents could also received from a member through another slot.

As another example, the exemplary system could be configured to simulate a virtual lending process where members can discuss loan options with a virtual associate. Members could also receive, sign and submit loan papers to the virtual associate. A similar process could be used to conduct any other kinds of banking or banking related business. These can include processing mortgages and new insurance policies.

A virtual associate could be either a real employee or a virtual assistant. For a real employee, a live or recorded video feed of employee could be shown during the virtual transaction. Alternatively, an avatar may be displayed that is suggestive of the associates behavior for various kinds of transactions. For a virtual assistant, an avatar could be used to give the member a sense of interacting with a person.

At the conclusion of any banking experience, some embodiments may include provisions to give the user a summarized report of what transpired during the banking session. The summarized report may include various details associated with the banking session. One or more of the following details may be included such as: the appointment date and time, transactions that occurred, account balances, and a collection of documents associated with any of the transactions. For example, if a user's meeting included signing and submitting documents for requesting a loan, a copy of the signed documents may be included in the summarized report of the banking session.

The user may be able to request the summarized report prior to concluding their banking session. In one embodiment, the summarized report may be sent directly to the user's banking application on their mobile device. The summarized report can also be sent to the user's email address. In another embodiment, the user may receive a physical paper copy of the summarized report prior to the conclusion of the banking session.

In some embodiments, the user may automatically receive a virtual or physical copy of the summarized report after the conclusion of the banking session, and prior to exiting enclosure 100. Kiosk 101 may be equipped to sense when the user is preparing to exit, and when this event occurs the user may be sent a copy of the summarized report of their banking session.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An enclosure comprising: a perimeter; a wall structure corresponding to the perimeter; the wall structure supporting a roof, the roof disposed above the wall structure; the wall structure and the roof defining an interior void of the enclosure; wherein a portion of the wall structure includes a sound attenuating material; an interactive device disposed on an exterior surface of the wall structure; the wall structure including a doorway with a door that provides access to the interior void of the enclosure; a security system associated with the door, wherein the security system selectively locks and unlocks the door to allow a user to enter through the doorway into the interior void of the enclosure an interactive system disposed within the interior void of the enclosure, the interactive system configured to provide virtual banking services to the user within the enclosure; the interactive system including a camera and a display, wherein a bank associate is displayed on the display to provide the virtual banking services to the user; the interactive system further including a slot disposed proximate the display, wherein the slot is configured to selectively dispense a document when a command from a remote server is received, wherein access to the enclosure is scheduled by an appointment, made by the user through a mobile device; and wherein the mobile device used to schedule the appointment is also used by the user to interact with the security system to unlock the door to allow the user to enter into the interior void of the enclosure, and wherein climate settings of the enclosure are accessed through the mobile device.

2. The enclosure according to claim 1, wherein a portion of the roof includes a sound attenuating material.

3. The enclosure according to claim 1, wherein the interactive device disposed on the exterior surface of the wall structure is an automated teller machine.

4. The enclosure according to claim 1, wherein the interactive system disposed within the interior void of the enclosure includes a desk surface and at least one chair.

5. The enclosure according to claim 1, wherein the display includes an avatar of the bank associate, and wherein the slot dispenses a document to the user within the enclosure when the avatar on the display moves a virtual document towards a virtual slot shown on the display.

6. The enclosure according to claim 5, wherein the virtual slot shown on the display is aligned with the slot proximate the display within the enclosure.

7. An enclosure comprising: a perimeter; a wall structure corresponding to the perimeter; the wall structure supporting a roof, the roof disposed above the wall structure; the wall structure and the roof defining an interior void of the enclosure; wherein a portion of the wall structure includes a sound attenuating material; an interactive device disposed on an exterior surface of the wall structure; the wall structure including a doorway with a door that provides access to the interior void of the enclosure; a security system associated with the door, wherein the security system selectively locks and unlocks the door to allow a user to enter through the doorway into the interior void of the enclosure; and wherein the security system unlocks the door if security information received from the user matches retrieved security information retrieved by the enclosure; wherein access to the enclosure is scheduled by an appointment made by the user through a mobile device; and wherein the mobile device used to schedule the appointment is also used by the user to interact with the security system to unlock the door to allow the user to enter into the interior void of the enclosure; and wherein climate preferences associated with the enclosure are included with the appointment made by the user through the mobile device.

8. The enclosure according to claim 7, wherein the security information includes mobile device information received from the mobile device.

9. The enclosure according to claim 8, wherein the security information includes proximity information determined from the mobile device information.

10. The enclosure according to claim 7, wherein the security information includes the mobile device successfully joining a wireless network broadcast by the enclosure.

11. The enclosure according to claim 7, wherein the security information includes mobile device information received from the mobile device, an entered passcode, and scheduling information associated with the appointment made by the user.

12. A static structure comprising an enclosure, the enclosure comprising: a perimeter; a wall structure corresponding to the perimeter; the wall structure supporting a roof, the roof disposed above the wall structure; the wall structure and the roof defining an interior void of the enclosure; wherein a portion of the wall structure includes a sound attenuating material; an interactive device disposed on an exterior surface of the wall structure; the wall structure including a doorway with a door that provides access to the interior void of the enclosure; an interactive system disposed within the interior void of the enclosure, the interactive system configured to provide virtual banking services to a user within the enclosure; the interactive system including a camera and a display, wherein a bank associate is displayed on the display to provide the virtual banking services to the user; the interactive system further including a slot disposed proximate the display, wherein the slot is configured to selectively dispense a document when a command from a remote server is received, wherein access to the enclosure is scheduled by an appointment made by the user through a mobile device; wherein the mobile device used to schedule the appointment is a so used by the user to interact with the security system to unlock the door to allow the user to enter into the interior void of the enclosure; and wherein a temperature of the interior void of the enclosure is adjusted prior to the appointment based on a climate preference of the user.

13. The static structure according to claim 12, wherein the interactive system displays an image of the document as the document is being dispensed from the slot.

14. The static structure according to claim 13, wherein the image of the document is substantially aligned with the document as the document is being dispensed from the slot.

15. The static structure according to claim 12, wherein the interactive system includes a second slot spaced from the first slot.

16. The static structure according to claim 15, wherein the second slot is configured to dispense cash.

17. The static structure according to claim 16, wherein an image of cash shown on the display is substantially aligned with the cash being dispensed by the second slot.

* * * * *